(12) United States Patent  
Ebihara et al.

(10) Patent No.: US 9,244,190 B2  
(45) Date of Patent: Jan. 26, 2016

(54) TRANSMITTING ELECTRIC POWER USING ELECTROMAGNETIC WAVES

(75) Inventors: Satoshi Ebihara, Osaka (JP); Kentaro Kawata, Osaka (JP)

(73) Assignee: OSAKA ELECTRO-COMMUNICATION UNIVERSITY, Osaka (JP)

( * ) Notice: Subject to any disclaimer, the term of this patent is extended or adjusted under 35 U.S.C. 154(b) by 663 days.

(21) Appl. No.: 13/548,226

(22) Filed: Jul. 13, 2012

(65) Prior Publication Data

US 2014/0015705 A1  Jan. 16, 2014

(51) Int. Cl.
  *G01S 7/03* (2006.01)
  *G01V 3/30* (2006.01)
  *H02J 17/00* (2006.01)

(52) U.S. Cl.
  CPC .. *G01V 3/30* (2013.01); *H02J 17/00* (2013.01)

(58) Field of Classification Search
  CPC ........... G01V 3/30; G01V 3/12; G01S 13/885
  USPC ............................................ 342/22; 324/338
  See application file for complete search history.

(56) References Cited

U.S. PATENT DOCUMENTS

| | | | | |
|---|---|---|---|---|
| 3,529,205 | A | * | 9/1970 | Miller .............................. 315/3.5 |
| 3,845,426 | A | * | 10/1974 | Barlow .......................... 333/240 |
| 5,168,234 | A | | 12/1992 | Freedman et al. |
| 5,552,786 | A | * | 9/1996 | Xia et al. ......................... 342/22 |
| 5,904,210 | A | * | 5/1999 | Stump et al. ..................... 175/45 |
| 6,719,068 | B2 | * | 4/2004 | Jonsson ............................ 175/19 |
| 7,483,793 | B2 | * | 1/2009 | Wang et al. ........................ 702/7 |
| 8,466,682 | B2 | * | 6/2013 | Wang ............................. 324/338 |

(Continued)

FOREIGN PATENT DOCUMENTS

| JP | 2000125486 | A | 4/2000 | |
|---|---|---|---|---|
| JP | 2009270919 | A | 11/2009 | |
| WO | WO 2006015402 | A1 * | 2/2006 | ............. G01S 13/88 |

OTHER PUBLICATIONS

W. Loewenstern, Jr. et al., "On the Feasibility of Power Transmission Using Microwave Energy in Circular Waveguide", Symposium on Microwave Power, University of Alberta, Mar. 25, 1966, pp. 57-64.

(Continued)

*Primary Examiner* — John B Sotomayor
*Assistant Examiner* — Marcus Windrich
(74) *Attorney, Agent, or Firm* — Ren-Sheng International

(57) ABSTRACT

Technologies are generally described for transmitting electric power using electromagnetic waves. An example device may include a transmitting unit, a dielectric waveguide, and a receiving unit. The transmitting unit can be configured to transmit the electromagnetic wave through a first waveguide. The dielectric waveguide can be configured to direct the electromagnetic wave from the first waveguide to a second waveguide. Further, the receiving unit can be configured to receive the electromagnetic wave from the dielectric waveguide through the second waveguide. An example borehole radar system may generate an electromagnetic wave from a DC power supply and provide the electromagnetic wave to a power transmitting unit. The power transmitting unit can be configured to transmit the electromagnetic wave through a dielectric waveguide. The electromagnetic wave can be rectified to generate a DC voltage signal, by which a transmitting antenna may be powered to generate a radar signal.

24 Claims, 9 Drawing Sheets

(56) References Cited

U.S. PATENT DOCUMENTS

| | | | |
|---|---|---|---|
| 8,558,548 B2* | 10/2013 | Minerbo et al. | 324/339 |
| 8,680,865 B2* | 3/2014 | Zhang et al. | 324/338 |
| 8,847,600 B2* | 9/2014 | Signorelli et al. | 324/338 |
| 2008/0061789 A1* | 3/2008 | Coates et al. | 324/333 |
| 2009/0277630 A1* | 11/2009 | McDaniel et al. | 166/250.1 |
| 2010/0283469 A1* | 11/2010 | Wang | 324/338 |
| 2013/0021207 A1* | 1/2013 | Lee | 343/700 MS |
| 2013/0169279 A1* | 7/2013 | Morys | 324/338 |
| 2013/0241561 A1* | 9/2013 | Allen | 324/338 |

OTHER PUBLICATIONS

Satoshi, Ebihara et al., "Study of Microwave Power Transmission by a Dielectric Waveguide for Borehole Radar", Jul. 19, 2011, Osaka Electro-Communication University.

Takayuki Shibata et al., "Development of In-Pipe Microrobot Using Microwave Energy Transmission", IEICE Trans. B, May 2000, pp. 704-710, vol. J83-B, No. 5.

Naoki Shinohara et al., "Experimental Study on "Wiress Power Space"", IEICE Technical Report, Mar. 2004, pp. 47-53, SPS2003-18.

Naoki Shinohara et al., "Wireless Charging System by Microwave Power Transmission for Electric Motor Vehicles" IEICE Trans. C, May 2004, pp. 433-443, vol. J87-C, No. 5.

Jae-Young Chung et al., "Two-Layer Dielectric Rod Antenna", IEEE Transactions on Antennas and Propagation, Jun. 2008, pp. 1541-1547, vol. 56, No. 6.

David J. Daniels, "Geophysical Application", Ground Penetrating Radar-2nd Edition, The Institution of Electrical Engineers, Chapter 11, 2004, pp. 437-500.

Iain M. Mason et al., "The Effect of Conduction on VHF Radar Images Shot in Water-Filled Boreholes", IEEE Geoscience and Remote Sensing Letters, Apr. 2008, pp. 304-307, vol. 5, No. 2.

Takeshi Miura et al., "Study of High Power Rectennas for Microwave Power Transmission", IEICE Trans. B, Apr. 2000, pp. 525-533, vol. J83-B, No. 4.

Osamu Takechi et al., "Down-Sizing of Rectification Circuit for the Microwave Power Transmission", IEICE Trans. B, May 2003, pp. 850-854, vol. J86-B, No. 5.

\* cited by examiner

TRANSMITTING ELECTRIC POWER USING ELECTROMAGNETIC WAVES

BACKGROUND

Unless otherwise indicated herein, the approaches described in this section are not prior art to the claims in this application and are not admitted to be prior art by inclusion in this section.

A borehole radar device is a subsurface detection tool that can be used for imaging geological targets in resistive formations, e.g., the delineation of orebody geometry, ideally using routinely drilled cover and exploration boreholes. Such radar device may be used in performing radar measurements of fractures or faults in geological targets under the ground, using electromagnetic waves having certain frequency bandwidth, e.g., frequencies of 10 MHz to several hundred MHz. This type of measurement typically requires supplying electric power to antennas in boreholes for transmitting and detecting radar signals and for transmitting the detected radar signals to an analysis device installed on the ground.

In one example, a borehole radar device can be equipped with a battery that is operable as a power supply, where the battery can be recharged at certain intervals. Recharging the battery may require pulling the radar device out of a borehole under the ground in order to access the battery for recharging, and reinstalling the radar device into the borehole after completing the recharging of the battery. Also, due to the limited charge duration of the battery, it may be difficult for the radar device to perform continuous radar measurement operation.

In another example, electric power may be supplied from an external power source to a borehole radar device through a power supply cable, e.g., made of a metallic cylindrical conductor. In this case, electromagnetic waves generated by a transmitting antenna of the radar device may be used to induce a current flowing through the power supply cable, which causes scattering of the electromagnetic waves. This scattering causes electrical coupling between the power supply cable and the antenna. Also, the scattered electromagnetic waves generated by the power supply cable may be received by a receiving antenna, which can be installed in another borehole for detecting radar measurement signals, and interfere with the detection of radar measurement signals by the receiving antenna.

SUMMARY

Technologies are generally described for transmitting electric power using electromagnetic waves.

Various example apparatus described herein may include a transmitting unit, a first waveguide, a second waveguide, a dielectric waveguide, and a receiving unit. The transmitting unit can be configured to receive an electromagnetic wave and transmit the electromagnetic wave through the first waveguide. The dielectric waveguide can be configured to receive the electromagnetic wave from the first waveguide and direct the electromagnetic wave to a second waveguide. The receiving unit can be configured to receive the electromagnetic wave from the dielectric waveguide through the second waveguide. The dielectric waveguide can be adapted to have a cylindrical shape and/or include multiple directors substantially equally spaced from each other in an elongated direction of the dielectric waveguide. Each of the directors can be configured to have a rod shape having a length shorter than a wavelength of the electromagnetic wave. Further, an elongated direction of each director may be substantially perpendicular to the elongated direction of the dielectric waveguide. Each of the first and second waveguides may include a dielectric material shielded with a metallic material and may include a monopole antenna one end of which is coupled to the metallic material.

In some examples, a borehole radar system is described such as any example system described herein that can be adapted to utilize an oscillating unit, a power transmitting unit, and a rectifying unit. The oscillating unit can be configured to generate an electromagnetic wave from a direct current (DC) power supply. The power transmitting unit can be configured to receive the electromagnetic wave from the oscillating unit and transmit the electromagnetic wave through a dielectric waveguide. Further, the rectifying unit can be configured to receive the electromagnetic wave from the dielectric waveguide and rectify the electromagnetic wave to generate a DC voltage signal. The borehole radar system can be further configured to utilize a transmitting antenna configured to generate a radar signal based on the DC voltage signal, and a receiving antenna configured to receive the radar signal from the transmitting antenna.

In some examples, a method for transmitting electric power using an electromagnetic wave is described such as any example method described herein that may be performed by any example borehole radar systems described herein. The example methods may include generating a radar signal and converting the radar signal into an optical signal. In the methods, an oscillating unit can generates an electromagnetic wave from a DC power supply. Also, a power transmitting unit can transmit the electromagnetic wave through a dielectric waveguide. A rectifying unit then can rectify the electromagnetic waves to generate a DC voltage signal. An OLE (optical-to-electrical) converter, which is driven to operate based on the DC voltage signal, can convert the optical signal into an electrical signal to be transmitted through a transmitting antenna.

In some examples, a computer-readable storage medium is described that may be adapted to store a program for causing a borehole radar system to carry out radar measurements. The borehole radar system may include various features as further described herein. The program may include one or more instructions for generating a radar signal and converting the radar signal into an optical signal. The instructions can be further configured to generate, by an oscillating unit, an electromagnetic wave from a DC power supply, and transmit, by a power transmitting unit, the electromagnetic wave through a dielectric waveguide. Further, the instructions can be configured to rectify, by a rectifying unit, the electromagnetic waves to generate a DC voltage signal, and convert, by an O/E (optical-to-electrical) converter which is driven to operate based on the DC voltage signal, the optical signal into an electrical signal to be transmitted through a transmitting antenna.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
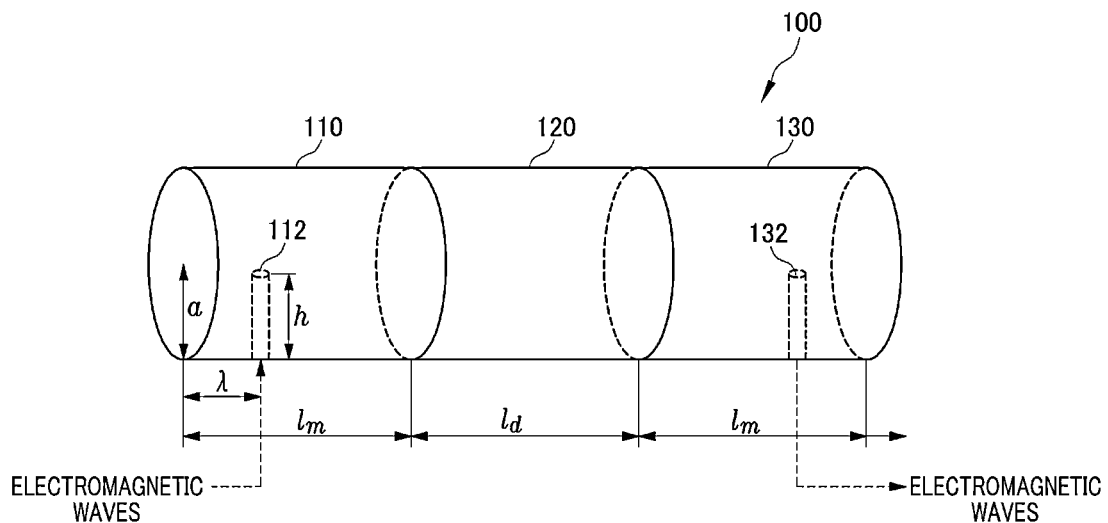
FIG. 1 schematically shows an illustrative example power transmitting device configured to transmit electric power using electromagnetic waves through waveguides.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to transmitting electric power using electromagnetic waves.

Briefly stated, technologies are generally described for transmitting electric power using electromagnetic waves, which may be utilized in a borehole radar system for imaging geological targets under the ground. As used herein, the term electromagnetic waves (and other variants such as microwaves) may include any one of electric, magnetic, or combined electric/magnetic energy or fields or waves. A power transmitting device may be configured to transmit electric power using electromagnetic waves through a waveguide having a substantially cylindrical shape. To confine the energy of electromagnetic waves within the cylindrical waveguide, a dielectric material with suitable dielectric constant may be used in forming the waveguide.

In some embodiments, to effectively generate and excite electromagnetic waves in a single mode within a dielectric waveguide, two mono-pole antennas may be disposed at transmitting and receiving ends of the waveguide, respectively, such that an elongated direction of each mono-pole antenna is substantially perpendicular to the inner side wall of the waveguide. Further, the transmitting and receiving ends of the waveguide may be covered by a substantially metallic material to provide a ground plane for each antenna and improve the directivity of the electromagnetic waves. In some embodiments, multiple directors may be embedded between the two mono-pole antennas within the dielectric waveguide in such a manner that the directors are substantially equally spaced from each other in an elongated direction of the dielectric waveguide.

FIG. 1 schematically shows an illustrative example power transmitting device 100 configured to transmit electric power using electromagnetic waves through waveguides arranged in accordance with at least some embodiments described herein.

As depicted, power transmitting device 100 may include a transmitting unit 110, a dielectric waveguide 120, and a receiving unit 130. Transmitting unit 110 may include a substantially metallic waveguide having a substantially cylindrical shape which is filled with a dielectric material. The waveguide of transmitting unit 110 may be made of any suitable type of metallic material. Also, an amount of metal contained in the waveguide may be adjusted as long as the metallic waveguide of transmitting unit 110 can serve to improve the directivity of electromagnetic waves to be transmitted from transmitting unit 110. For example, the waveguide may be fabricated by coating the dielectric material with a paint or epoxy containing metallic material. Also, the thickness of the waveguide may be preset to be about 0.1 mm. One end of the metallic waveguide may be terminated with a short-circuit such as a conductor plate, e.g., made of a substantially metallic material, while the other end of the metallic waveguide may be coupled to a dielectric waveguide 120. Further, a monopole antenna 112 may be embedded in the dielectric material within the metallic waveguide of transmitting unit 110. One end of monopole antenna 112 may be coupled to an inner side wall of the metallic waveguide in a direction substantially perpendicular to the side wall of the metallic waveguide.

Further, dielectric waveguide 120 may be coupled to receiving unit 130, which may include a substantially metallic waveguide having a substantially cylindrical shape, which can be filled with a dielectric material. As described above, the metallic waveguide of receiving unit 130 may be made of any suitable type of metallic material. Also, an amount of metal contained in the waveguide may be adjusted as long as the waveguide can be configured to improve the directivity of electromagnetic waves to be transmitted from dielectric waveguide 120 and received by receiving unit 130. For example, the waveguide may be fabricated by coating the dielectric material with a paint or epoxy containing metallic material. Also, the thickness of the waveguide may be preset to be about 0.1 mm. One end of the metallic waveguide may be terminated with a short-circuit such as a conductor plate, e.g., made of a substantially metallic material, while the other end of the metallic waveguide can be coupled to dielectric waveguide 120. Further, a monopole antenna 132 may be embedded in the dielectric material within the metallic waveguide of receiving unit 130. One end of monopole antenna 132 may be coupled to an inner side wall of the metallic waveguide of receiving unit 130 in a direction substantially perpendicular to the side wall of the metallic waveguide.

In some embodiments, transmitting unit 110 may be configured to receive electric power carried in a form of electromagnetic waves through the one end of monopole antenna 112, which can be coupled to the inner side wall of the metallic waveguide. Monopole antenna 112 may be configured to emit the electromagnetic waves within the metallic waveguide of transmitting unit 110, which may be then transmitted through dielectric waveguide 120 towards monopole antenna 132 installed in receiving unit 130. The electromagnetic waves received by monopole antenna 132 may be converted into a DC voltage signal, which will be described later.

In some embodiments, monopole antenna 112 may be configured to be disposed substantially in a radial direction towards the center of a cylindrical waveguide such as the metallic waveguide of transmitting unit 110. Thus, in such configuration, the waveguide may be configured to excite electromagnetic waves in a single mode (e.g., $TE_{nm}$ mode or $TM_{nm}$ mode, where n and m are equal to or greater than 0), which will be described later. Such modes may be determined depending, in part, on the type of transmission medium filled within the waveguide and the frequency bandwidth of the electromagnetic waves to be transmitted therein.

When electromagnetic waves are being transmitted within a metallic waveguide such as the metallic waveguide of transmitting unit 110 or receiving unit 130, the electromagnetic waves may be reflected on the inner side wall of the metallic waveguide and interfere with each other. In this manner, an electromagnetic field distribution (i.e., single mode) unique to the frequencies of the electromagnetic waves may be formed within the waveguide. Specifically, when a substantially metallic waveguide that is substantially filled with a dielectric material is used to transmit electromagnetic waves, a specified single mode such as the $TE_{11}$ mode may be formed therein depending on the frequency bandwidth of the electromagnetic waves. A cut-off frequency for a particular single mode may be determined based on the waveguide cross-sectional dimension (e.g., a radius or width a of the waveguide cross section) and the type of transmission medium filled in the metallic waveguide, using any suitable equation known in the art.

Further, electromagnetic waves having certain frequencies may be excited in a single mode, such as the $HE_{11}$ mode, within a dielectric waveguide such as dielectric waveguide 120 when the frequencies of the electromagnetic waves falls within a bandwidth defined by lower and upper cut-off frequencies of the specified single mode (e.g., $HE_{11}$). In such modes, the electromagnetic waves may be transmitted through dielectric waveguide 120 without causing a significant attenuation of the electric power carried in the electromagnetic waves.

Although transmitting unit 110, dielectric waveguide 120, and receiving unit 130 are described above to have a substantially cylindrical shape, the present disclosure may not be limited thereto. For example, each of transmitting unit 110, dielectric waveguide 120, and receiving unit 130 may have any other suitable shape such as rectangular, elliptical and polygonal shapes.

Figure 2:
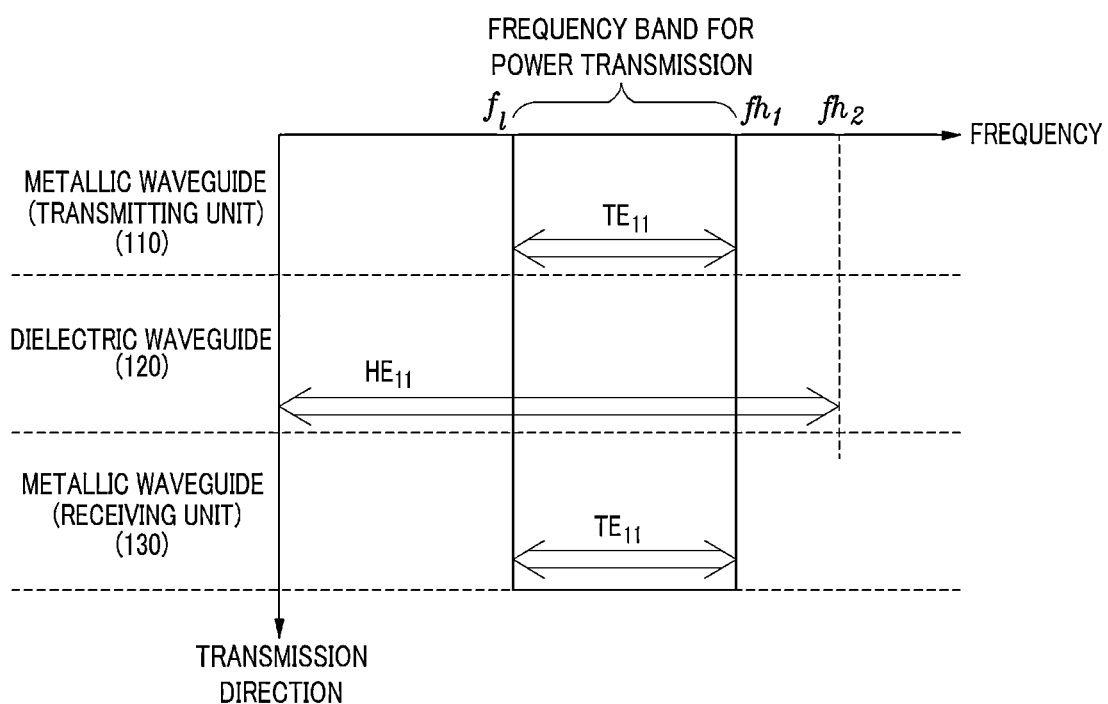
FIG. 2 shows illustrative example frequency bandwidth of electromagnetic waves that can be transmitted through waveguides of an illustrative example power transmission device in corresponding single modes.

FIG. 2 shows illustrative example frequency bandwidth of electromagnetic waves that can be transmitted through the waveguides of power transmission device 100 in corresponding single modes.

As shown, electromagnetic waves with frequency bandwidth from a lower cut-off frequency $f_l$ to an upper cut-off frequency $f_{h1}$ for a specified single mode such as the $TE_{11}$ mode may be transmitted within the metallic waveguide of transmitting unit 110. The electromagnetic waves in the above frequency bandwidth can be transmitted with a reduced loss in the energy of the electromagnetic waves compared to the electromagnetic waves out of the frequency bandwidth. This is because such electromagnetic waves can be excited in the $TE_{11}$ mode, which is unique to the metallic waveguide filled with a dielectric material. Further, the electromagnetic waves with frequencies beyond the upper cut-off frequency $f_{h1}$ may be excited in another mode (e.g., $TM_{01}$ mode) along with the $TE_{11}$ mode. This may cause the interference between the waves excited with different modes and thus result in further attenuation of the energy of the electromagnetic waves.

Further, as illustrated in FIG. 2, the electromagnetic waves may be excited in the $HE_{11}$ mode within dielectric waveguide 120 over a broader frequency bandwidth than those transmitted through the metallic waveguide. If the electromagnetic waves with frequencies beyond an upper cut-off frequency $f_{h2}$ may be excited in another mode along with the $HE_{11}$ mode, which may cause interference between the waves with different modes and thus further attenuation of the energy of the electromagnetic waves may be achieved.

In the meantime, similar to the electromagnetic waves transmitted through transmitting unit 110, electromagnetic waves with frequency bandwidth in the range from the lower cut-off frequency $f_l$ to the upper cut-off frequency $f_{h1}$ can be excited in the $TE_{11}$ mode and transmitted within the metallic waveguide of receiving unit 130 with a reduced loss in the energy of the electromagnetic waves. Accordingly, in transmitting unit 110, dielectric waveguide 120 and receiving unit 130 of power transmission device 100, electromagnetic waves with frequencies in the range from the lower to the upper cut-off frequencies $f_l$ and $f_{h1}$ may be excited in the corresponding single modes and transmitted with a reduced loss in the energy of the electromagnetic waves compared to the electromagnetic waves out of the above frequency bandwidth.

In some embodiments, for respective modes unique to the waveguides, cut-off frequencies may be determined based on a cross-sectional dimension of the waveguides and the type of transmission medium filled in the waveguides. Referring back to FIG. 1, the cut-off frequency $f_{c(11)}$ of $TE_{11}$ mode for the metallic waveguide filled with a dielectric material in transmitting unit 110 may be determined, according to the following equation:

$$f_{c(11)} = \frac{v_p \chi_{ss}}{2\pi a} \qquad \text{Equation (1)}$$

where a indicates the radius of the metallic waveguide (when it has a cylindrical shape), and $\chi_{11}$ indicates the $1^{st}$ root of a Bessel function $J_1'(x)=0$. Also, in Equation (1), $v_p$ indicates a transmission velocity of electromagnetic waves within the waveguide, which may be determined using the following equation:

$$v_p = \frac{c}{\sqrt{\varepsilon_r}} \qquad \text{Equation (2)}$$

where c indicates a velocity of light in vacuum, and $\varepsilon_r$ indicates relative dielectric constant for the dielectric material filled in the metallic waveguide.

In some embodiments, using the above equations, the cut-off frequencies for single modes may be determined for various types of transmission medium filled in the waveguides used in power transmission device 100. The lowest cut-off frequency for a cylindrical metallic waveguide filled with a dielectric material can be obtained in the $TE_{11}$ mode. Further, the second lowest cut-off frequency for the waveguide can be obtained in the $TM_{01}$ mode. However, as discussed above, electromagnetic waves with frequencies higher than the cut-off frequency of the $TM_{01}$ mode may be excited in more than one mode, which may result in inefficiency in the power transmission. Accordingly, for power transmission using the metallic waveguide of transmitting unit 110 (or receiving unit 130) of power transmission device 100, the frequency bandwidth for electromagnetic waves may be selected in a range substantially from the cut-off frequency of $TE_{11}$ mode to the cut-off frequency of $TM_{01}$ mode. In the meantime, as described above, electromagnetic waves may be excited in the $HE_{11}$ mode in a dielectric waveguide such as dielectric waveguide 120. Since an electromagnetic field distribution is formed in a similar manner in both $TE_{11}$ mode and $HE_{11}$ mode, a smooth mode change can be made between the metallic waveguide of transmitting unit 110 and dielectric waveguide 120 or between dielectric waveguide 120 and the metallic waveguide of receiving unit 130.

In some embodiments, the size of respective components of power transmission device 100 as shown in FIG. 1 may be determined using a FDTD (finite-difference time-domain) method if the frequencies of electromagnetic waves to be transmitted and the type of transmission media filled in the waveguides are predetermined. For example, if the frequency of the electromagnetic waves is about 2 GHz and the dielectric constant $\varepsilon_r$ of the dielectric material used in the waveguides is about 2.49, the radius a of the waveguides (when it has a cylindrical shape) may be determined to be about 36 mm. Further, under the above conditions, the length h of the monopole antennas 112 and 132 may be determined to be about 26 mm, and the lengths $l_m$ and $l_d$ of the metallic waveguides and dielectric waveguide 120 may be determined to be about 0.2 m. The distance between the monopole antenna 112 and the left edge of the waveguide may be determined to be $$\frac{l_m}{4},$$

i.e. 50 mm. Also the distance between monopole antenna 132 and the right edge of the waveguide may be determined to be the same value 50 mm.

Figure 3:
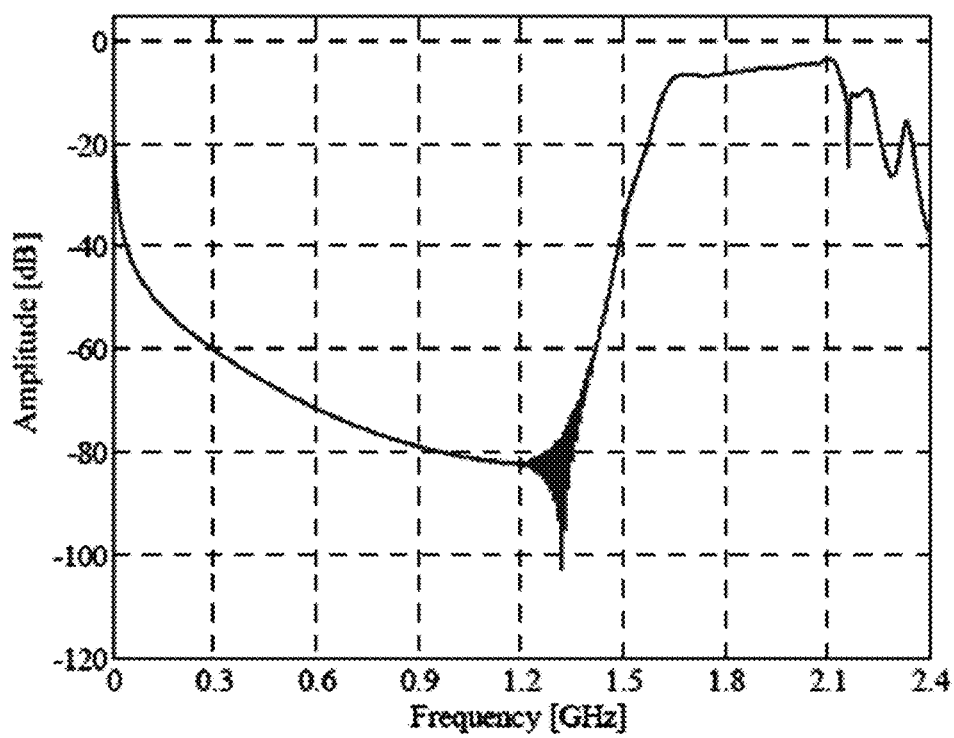
FIG. 3 shows a graph illustrating power transmission characteristic of electromagnetic waves simulated for an illustrative example power transmission device using an FDTD method.

FIG. 3 shows a graph illustrating power transmission characteristic of electromagnetic waves simulated for power transmission device 100 with the above conditions, using the FDTD method, in accordance with at least some embodiments described herein. As depicted, the amplitude of electromagnetic waves being transmitted by power transmission device 100 can be maintained to be stably high around the frequency of 2 GHz.

Figure 4:
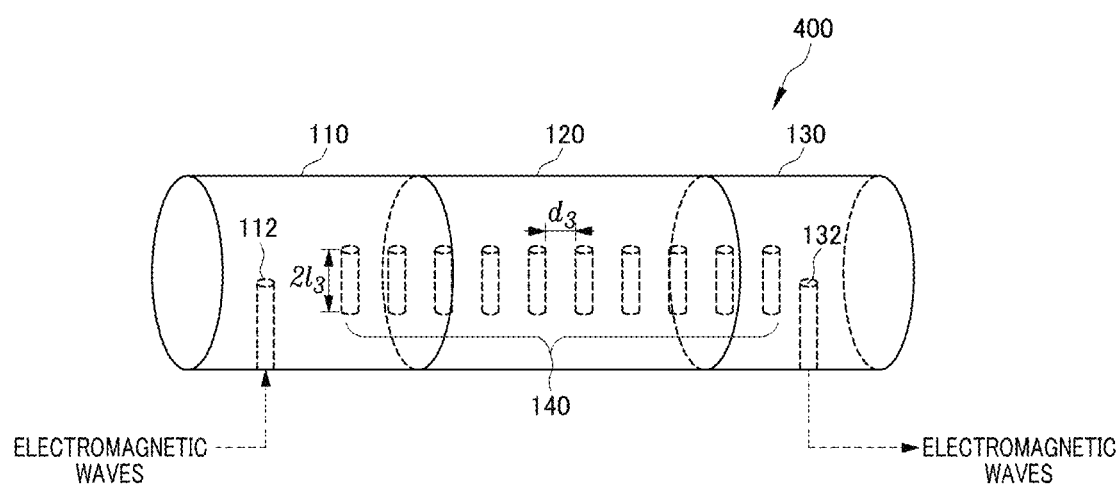
FIG. 4 schematically shows another illustrative example power transmitting device configured to transmit electric power using electromagnetic waves through waveguides.

FIG. 4 schematically shows another illustrative example power transmitting device 400 configured to transmit electric power using electromagnetic waves through waveguides arranged in accordance with at least some embodiments described herein. Power transmitting device 400 has a similar configuration to power transmitting device 100 as shown in FIG. 1, except for that multiple directors 140 are provided between monopole antennas 112 and 132 of transmitting unit 110 and receiving unit 130, respectively. Multiple directors 140 may be provided in power transmission device 400 to improve the directivity of electromagnetic waves being transmitted through the waveguides.

In some embodiments, multiple directors 140 may be embedded in the dielectric material filled within the waveguides. Each of directors 140 may be disposed in such a manner that an elongated direction of each director 140 is configured in a substantially perpendicular orientation with respect to the elongated direction of the waveguides. Further, directors 140 may be substantially equally spaced from each other along an elongated direction of the waveguides. Each of directors 140 may be substantially rod shaped with a length that is shorter than a wavelength of the electromagnetic waves to be transmitted through the waveguides.

In some embodiments, the configuration of directors such as the length of each director 140 and the space between adjacent directors 140 may be determined using the FDTD method. For example, as described above with respect to FIGS. 1 and 3, assume that the frequency of electromagnetic waves to be transmitted is about 1.5 GHz to about 3 GHz, more specifically about 2 GHz, and the dielectric constant $\varepsilon_r$ is about 2.49, the radius a of the waveguides may be determined to be about 43 mm to about 21 mm, more specifically about 36 mm. Further, under the above conditions, the length h of the monopole antennas 112 and 132 may be determined to be about 32 mm to about 16 mm, more specifically about 26 mm, and the lengths $l_m$ and $l_d$ of the metallic waveguides and the dielectric waveguide 120 may be determined to be about 254 mm to about 127 mm, more specifically about 200 mm.

Figure 5:
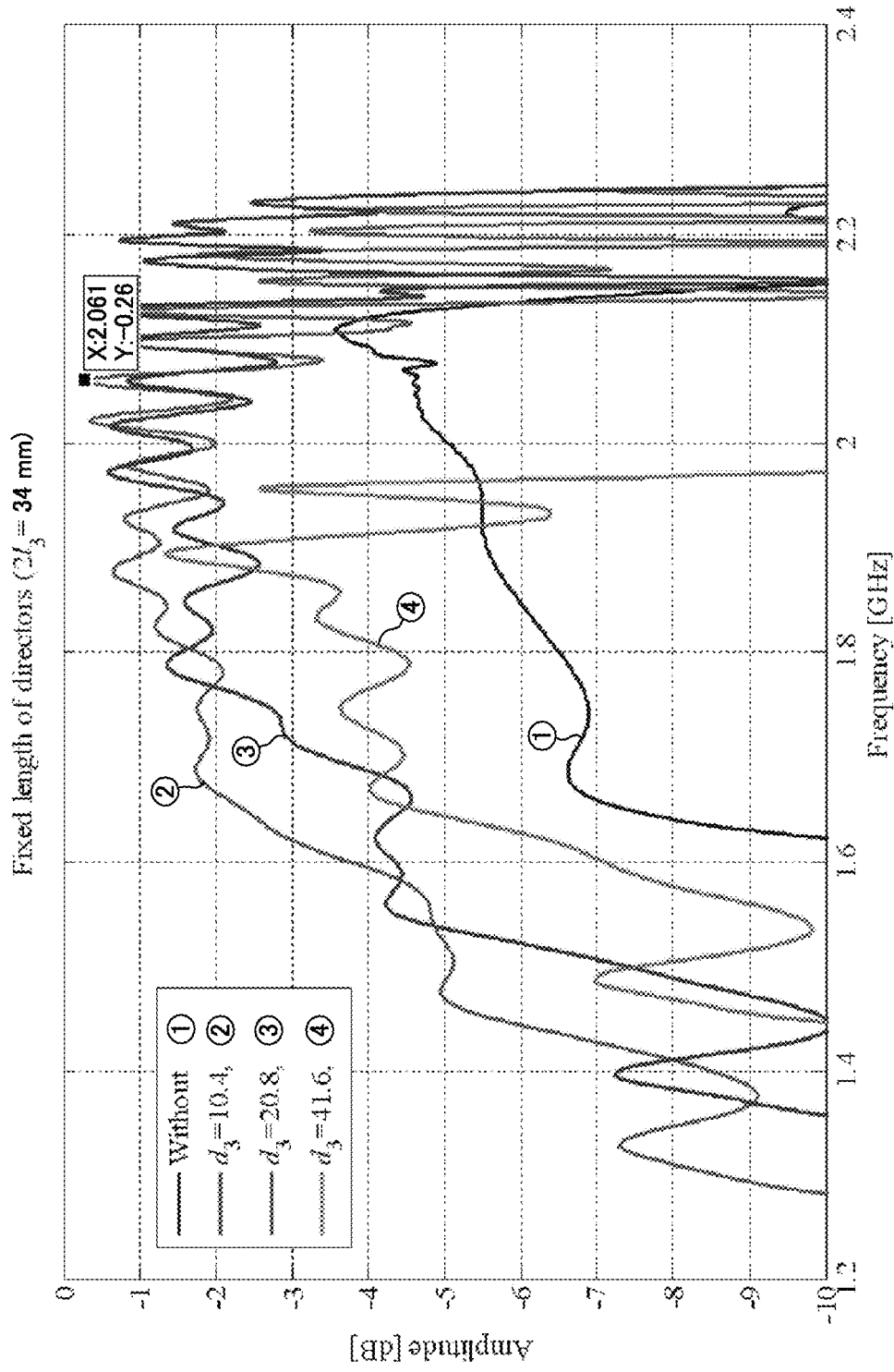
FIG. 5 shows a graph depicting power transmission characteristic of a waveguide which changes according to a change in the space between the directors when the length of each director is predetermined.

In the above setting, FIG. 5 illustrates the transmission characteristic of electromagnetic waves which may change according to a change in the space $d_3$ between two adjacent directors 140 when the length of each director 140 is fixed to be about 34 mm. According to the data shown in FIG. 5, in the case of setting the space $d_3$ to be about 10.4 mm, the amplitude of the electromagnetic waves can be stably maintained to be high near the frequency of 2 GHz (more specifically, maintained to be highest at about 2.06 GHz). Based on the data of FIG. 5, it may be assumed that the electromagnetic waves having a frequency of about 2 GHz may be excited in a single mode in the waveguides of power transmission device 100. Thus, the space $d_3$ between two adjacent directors 140 may be determined to be about 10.4 mm.

Figure 6:
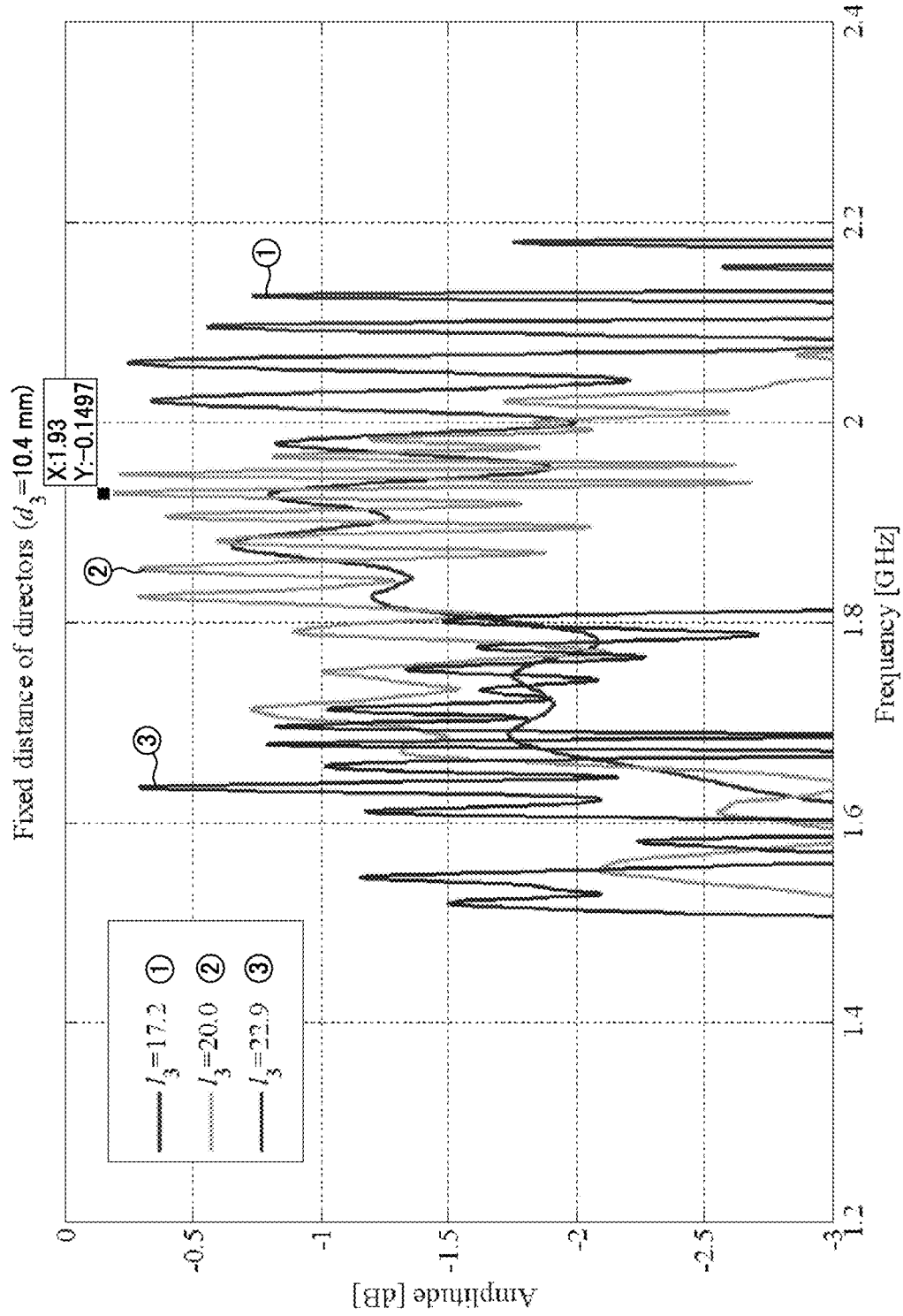
FIG. 6 shows a graph depicting power transmission characteristic of a waveguide which changes according to a change in the length of each director when the space between the directors is predetermined.

Further, FIG. 6 illustrates the transmission characteristic of electromagnetic waves which may change according to a change in the length $2l_3$ of each director 140 when the space $d_3$ between two adjacent directors 140 is fixed to be about 10.4 mm. According to the data shown in FIG. 6, in the case of setting $2l_3$ to be about 40 mm, the amplitude of the electromagnetic waves can be stably maintained to be highest near the frequency of about 1.93 GHz at which the electromagnetic waves may be excited in a single mode. Thus, the length of each director 140 $2l_3$ may be determined to be about 40 mm.

Figure 7:
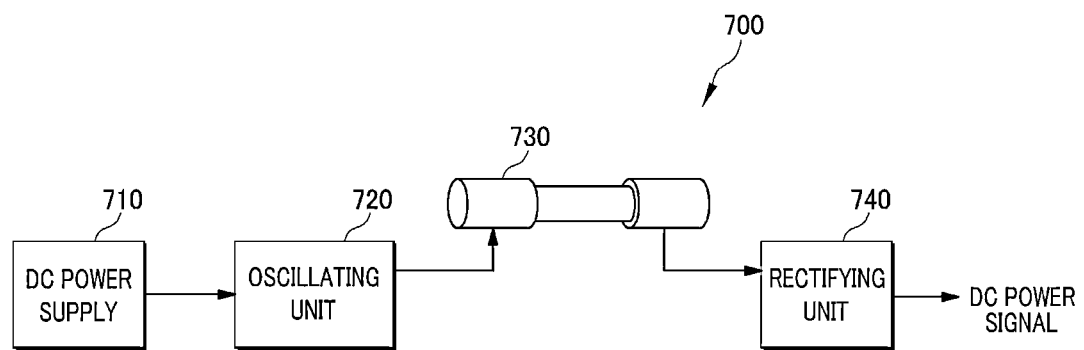
FIG. 7 shows a schematic block diagram illustrating an example power transmitting system that can be configured to transmit electric power using electromagnetic waves through waveguides.

FIG. 7 schematically shows an illustrative example power transmission system 700 configured to transmit electric power using electromagnetic waves arranged in accordance with at least some embodiments described herein.

Referring to FIG. 7, power transmission system 700 may include an oscillating unit 720 configured to generate an electromagnetic wave from a DC power supply 710. As described above with respect to FIGS. 1, 4, 5 and 6, the frequency of electromagnetic wave to be transmitted may be selected to be a particular value (e.g., about 2 GHz) under certain conditions, such that the electromagnetic wave may be excited in a single mode. Thus, in some embodiments, oscillating unit 720 may be configured to generate an electromagnetic wave having a particular frequency, which may be selected by an operator. Further, although not illustrated in FIG. 7, an amplifier may be additionally coupled to an output of oscillating unit 720 and configured to amplify the electromagnetic wave generated from oscillating unit 720.

In some embodiments, power transmission system 700 may further include a power transmission device 730 configured to receive the electromagnetic wave from oscillating unit 720 and transmit the electromagnetic wave through a dielectric waveguide. Power transmitting unit 730 may have the same configuration as any one of power transmitting devices 100 and 400 as shown in FIGS. 1 and 4. Specifically, the electromagnetic wave from oscillating unit 720 may be input to one end of a monopole antenna 112 installed on the inner wall of transmitting unit 110 and transmitted through dielectric waveguide 120. The transmitted electromagnetic wave may be received at monopole antenna 132 installed on the inner wall of receiving unit 130.

In some embodiments, power transmission system 700 may further include a rectifying unit 740 configured to receive the electromagnetic wave from power transmission device 730 and rectify the electromagnetic wave to generate a DC voltage signal. In the case where power transmission system 700 is used in a borehole radar system, the generated DC voltage signal may be transmitted to a transmitting antenna (not shown) that can be configured to be powered by the DC voltage signal to generate a radar signal. The radar signal generated by the transmitting antenna may be reflected by geological targets and received by a receiving antenna.

Figure 8:
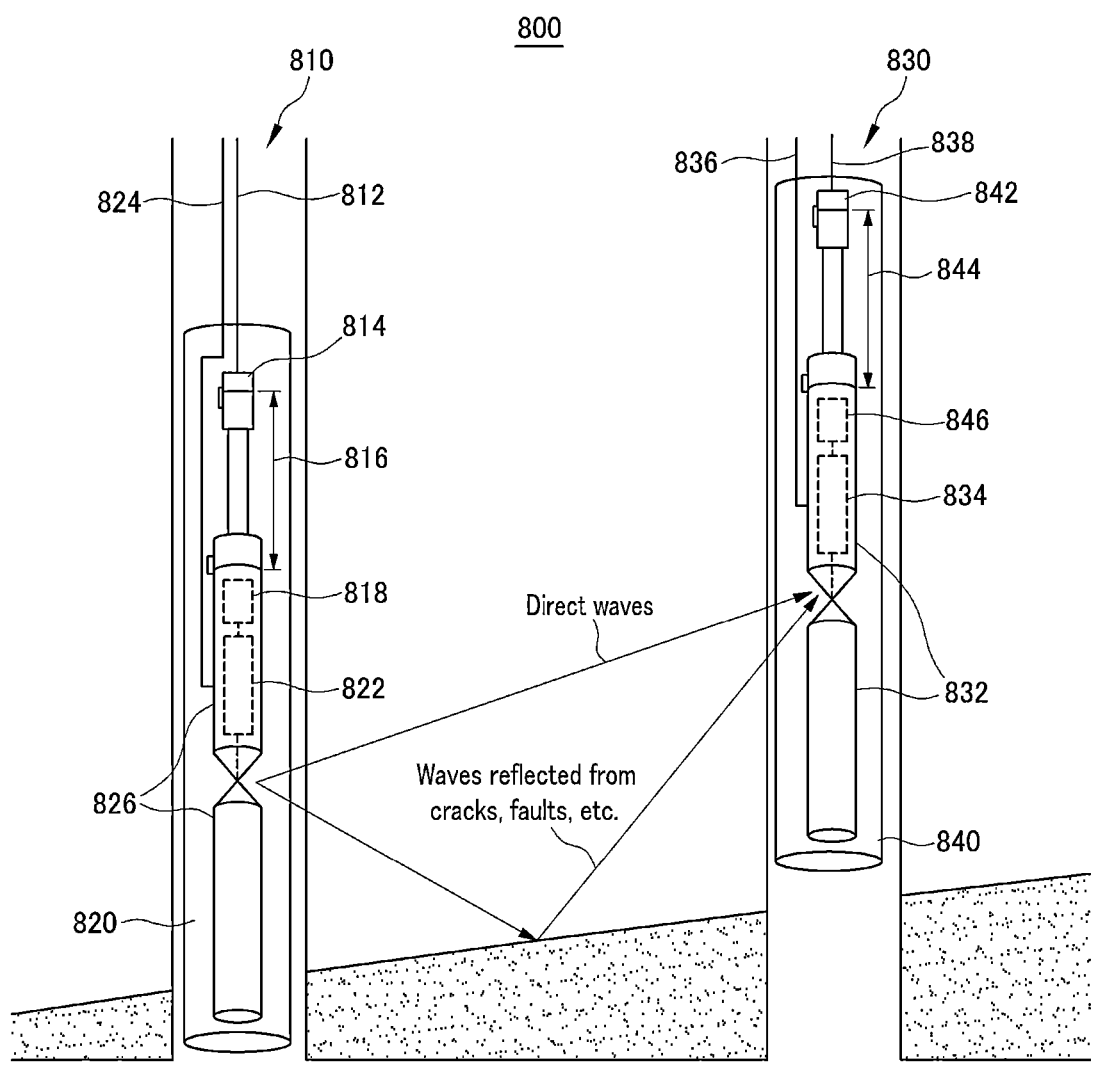
FIG. 8 schematically depicts an illustrative example borehole radar system using a power transmission device configured to transmit electric power using electromagnetic waves through waveguides.

FIG. 8 schematically shows an illustrative example borehole radar system arranged in accordance with at least some embodiments described herein. As shown, a borehole radar system 800 may include a radar transmitting device 810, and a radar receiving device 830. The radar transmitting device 810 may be installed in a borehole and configured to transmit radar signals against geological target objects located under the ground. The radar receiving device 830 may be installed in another borehole and configured to receive radar signals transmitted from radar transmitting device 810 and/or reflected by geological target objects that are located under the ground. Although radar transmitting device 810 and radar receiving device 830 are illustrated to be installed in separate boreholes in FIG. 8, in some embodiments, radar transmitting device 810 and radar receiving device 830 may alternatively be installed in a single borehole.

In some embodiments, radar transmitting device 810 may be shielded with a waterproof FRP vessel 820 to protect its components from being affected by moisture. Also, radar transmitting device 810 may be configured to receive electric power from an external source (not shown) through a metallic power supply cable 812. The supplied electric power can be provided to an oscillating unit 814, which may be configured to generate an electromagnetic wave from the supplied power. As described above with respect to FIGS. 1, 4, 5 and 6, the frequency of electromagnetic waves to be transmitted may be selected to be a particular value (e.g., about 2 GHz) under certain conditions such that the electromagnetic wave may be excited in a single mode. Thus, in some embodiments, oscillating unit 814 may be configured to generate an electromagnetic wave having a particular frequency that may be selected by an operator. Further, although not illustrated in FIG. 8, an amplifier may be additionally coupled to an output of oscillating unit 814 and configured to amplify the output electromagnetic wave. Then, a power transmitting device 816 may receive the electromagnetic wave from oscillating unit 814 and transmit the electromagnetic wave through a dielectric waveguide. Power transmission device 816 may have the same configuration as any one of power transmission devices 100 and 400 as shown in FIGS. 1 and 4. Further, a rectifying unit 818 may receive the electromagnetic wave from power transmission device 816 and rectify the electromagnetic wave to generate a DC voltage signal.

The DC voltage signal generated by rectifying unit 818 may be provided to an O/E (optical-to-electrical) converter 822 to generate radar signals based on optical signals provided through an optical fiber 824. The optical signals may be provided from a radar measurement system installed outside the borehole. Such radar measurement system may be implemented using any suitable computing device including, but not limited to, a general-purpose computer system and a portable electronic device such as a laptop computer, a tablet computer, etc. Further, for example, optical fiber 824 may be a single-mode optical fiber. The radar signals generated by O/E converter 822 may be transmitted by a dipole antenna 826 towards geological target objects under the ground.

In the meantime, radar receiving device 830 may be configured to receive radar signals transmitted from radar transmitting device 810 and/or reflected from the geological target objects through a dipole antenna 832. The received radar signals may be converted by an E/O (electrical-to-optical) converter 834, which may be operated by electrical power supplied by a power transmission system. An example power transmission system may include an oscillating unit 842, a power transmission device 844, and a rectifying unit 846. E/O converter 834 may be configured to convert the received radar signals to optical signals, which are then transmitted through an optical fiber 836 to the radar measurement system installed outside the borehole for further processing.

Figure 9:
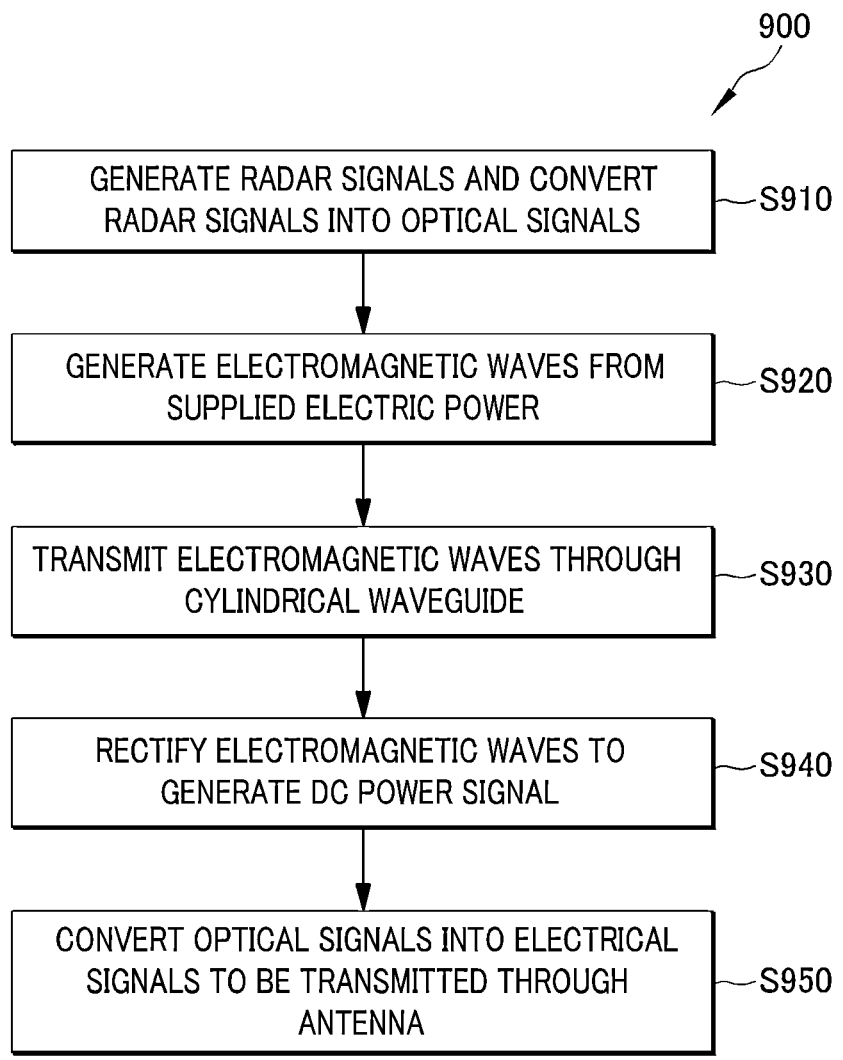
FIG. 9 shows an example flow diagram of a method adapted to operate a power transmission apparatus in a borehole radar system.

FIG. 9 shows an example flow diagram of a method adapted to operate a power transmission device in a borehole radar system arranged in accordance with at least some embodiments described herein. An example method 900 in FIG. 9 may be implemented using, for example, a computing device including a processor adapted to control a borehole radar system to generate radar signals and perform an analysis of radar signals detected by the borehole radar system.

Method 900 may include one or more operations, actions, or functions as illustrated by one or more of blocks S910, S920, S930, S940 and/or S950. Although illustrated as discrete blocks, various blocks may be divided into additional blocks, combined into fewer blocks, or eliminated, depending on the desired implementation. In some further examples, the various described blocks may be implemented as a parallel process instead of a sequential process, or as a combination thereof. Method 900 may begin at block S910.

At block S910, radar signals are generated and converted into optical signals. In particular, the computing device may be adapted to control the borehole radar system to generate radar signals in a form of electrical signal. In some embodiments, a graphical user interface may be provided on the computing device to receive an operator's input such as an instruction for initiating the generation of radar signals and various parameters for generating the radar signals including, but not limited to, the frequency of the radar signals. The radar signals in the form of electrical signal may be converted into optical signals, which then may be transmitted to a transmitting dipole antenna through an optical fiber. Block S910 may be followed by block S920.

At block S920, electromagnetic waves are generated from supplied electric power. In particular, the power transmission device of the borehole radar system is operated to receive electric power provided from an external source, e.g., through a metallic power supply cable, and generate electromagnetic waves from the supplied electric power. In some embodiments, the electromagnetic waves may be generated by an oscillator from the supplied electric power and/or the electromagnetic waves may be amplified by an amplifier to obtain electromagnetic waves with a desired amplitude. Block S920 may be followed by block S930.

At block S930, the electromagnetic waves are transmitted through a waveguide. In particular, the power transmission device may be adapted to transmit the electromagnetic waves through a substantially cylindrical waveguide. In some embodiments, the shape of the waveguide may not be limited to a cylinder, but the waveguide may have other shapes such as a rectangular, an elliptical, a polygonal shapes. The waveguide may be made of a dielectric material, two ends of which are shielded with a substantially metallic material. In some embodiments, the electromagnetic waves may be transmitted from a monopole antenna installed on an inner side wall of one end of the waveguide. The electromagnetic waves transmitted from the monopole antenna may be received by another monopole antenna installed on an inner side wall of the other end of the waveguide. Block S930 may be followed by block S940.

At block S940, the electromagnetic waves are rectified to generate a DC power signal. In particular, a rectifier of the borehole radar system may be adapted to receive the electromagnetic waves from the power transmission device and rectify the received electromagnetic waves to generate a DC power signal. Block S940 may be followed by block S950.

At block S950, the optical signals are converted into electrical signals to be transmitted through an antenna. In particular, the DC power signal may be provided to an O/E converter of the borehole radar system, which may be configured to receive the optical signals transmitted through the optical fiber and convert the optical signals to electrical signals. The electrical signals may be provided to the transmitting dipole antenna, such that the signals can be emitted towards geological target objects.

One skilled in the art will appreciate that, for this and other methods disclosed herein, the functions performed in the methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 10:
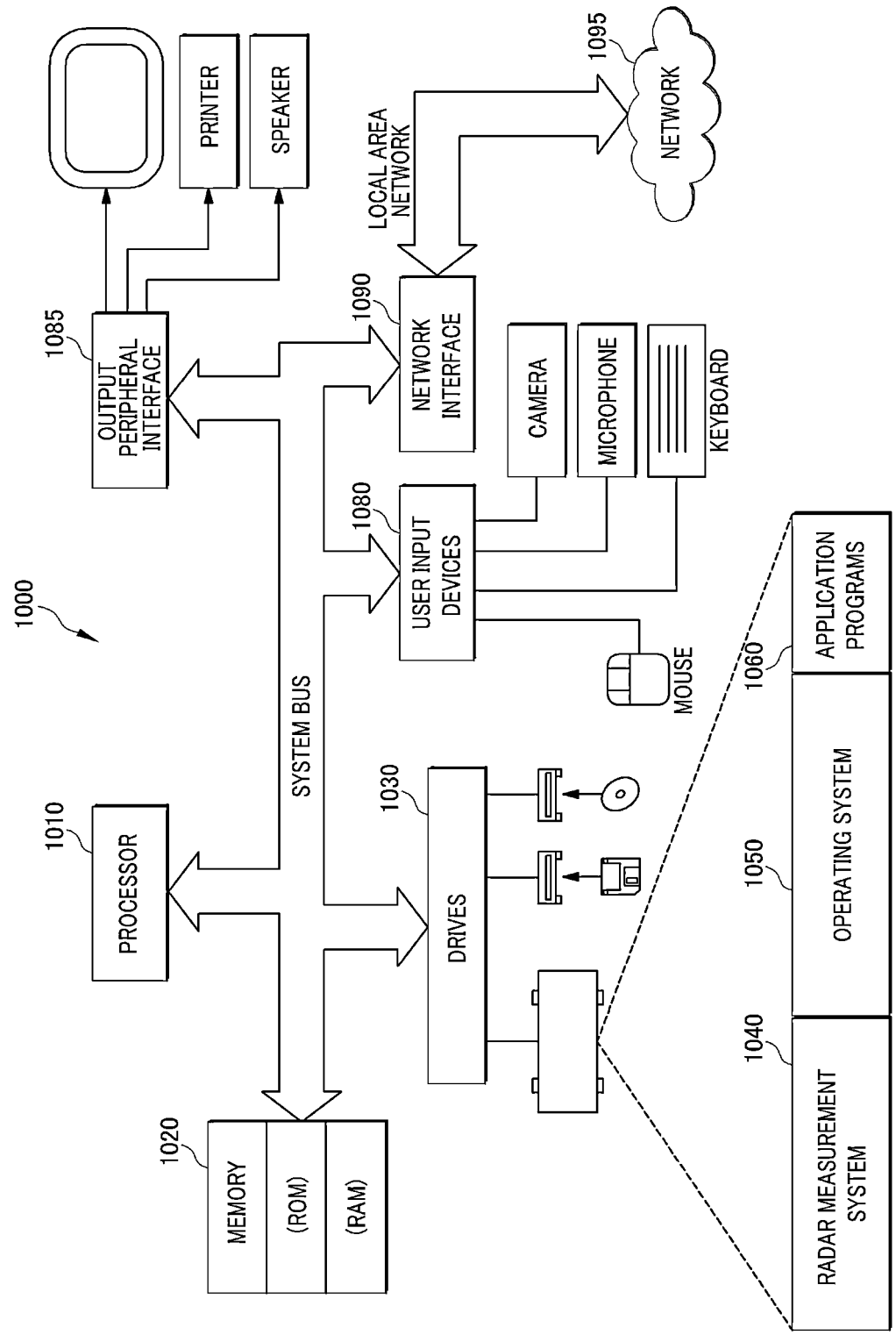
FIG. 10 shows a schematic block diagram illustrating an example computing system that can be configured to operate a borehole radar system including a power transmission device.

FIG. 10 shows a schematic block diagram illustrating an example computing system that can be configured to operate a borehole radar system including a power transmission device arranged in accordance with at least some embodiments described herein. As depicted in FIG. 10, a computer 1000 may include a processor 1010, a memory 1020 and one or more drives 1030. Computer 1000 may be implemented as a conventional computer system, an embedded control computer, a laptop, or a server computer, a mobile device, a set-top box, a kiosk, a vehicular information system, a mobile telephone, a customized machine, or other hardware platform.

Drives 1030 and their associated computer storage media may provide storage of computer readable instructions, data structures, program modules and other data for computer 1000. Drives 1030 may include a radar measurement system 1040, an operating system (OS) 1050, and application programs 1060. Radar measurement system 1040 may be adapted to control the borehole radar system to generate radar signals and perform an analysis of radar signals detected by the borehole radar system. Additionally, radar measurement system 1040 may be adapted to control the power transmission device in such a manner as described above with respect to FIGS. 1 to 9.

Computer 1000 may further include user input devices 1080 through which a user may enter commands and data. Input devices can include an electronic digitizer, a camera, a microphone, a keyboard and pointing device, commonly referred to as a mouse, trackball or touch pad. Other input devices may include a joystick, game pad, satellite dish, scanner, or the like.

These and other input devices can be coupled to processor 1010 through a user input interface that is coupled to a system bus, but may be coupled by other interface and bus structures, such as a parallel port, game port or a universal serial bus (USB). Computers such as computer 1000 may also include other peripheral output devices such as display devices, which may be coupled through an output peripheral interface 1085 or the like.

Computer 1000 may operate in a networked environment using logical connections to one or more computers, such as a remote computer coupled to a network interface 1090. The remote computer may be a personal computer, a server, a router, a network PC, a peer device or other common network node, and can include many or all of the elements described above relative to computer 1000.

Networking environments are commonplace in offices, enterprise-wide area networks (WAN), local area networks (LAN), intranets, and the Internet. When used in a LAN or WLAN networking environment, computer 1000 may be coupled to the LAN through network interface 1090 or an adapter. When used in a WAN networking environment, computer 1000 typically includes a modem or other means for establishing communications over the WAN, such as the Internet or a network 1095. The WAN may include the Internet, the illustrated network 1095, various other networks, or any combination thereof. It will be appreciated that other mechanisms of establishing a communications link, ring, mesh, bus, cloud, or network between the computers may be used.

In some embodiments, computer 1000 may be coupled to a networking environment. Computer 1000 may include one or more instances of a physical computer-readable storage medium or media associated with drives 1030 or other storage devices. The system bus may enable processor 1010 to read code and/or data to/from the computer-readable storage media. The media may represent an apparatus in the form of storage elements that are implemented using any suitable technology, including but not limited to semiconductors, magnetic materials, optical media, electrical storage, electrochemical storage, or any other such storage technology. The media may represent components associated with memory 1020, whether characterized as RAM, ROM, flash, or other types of volatile or nonvolatile memory technology. The media may also represent secondary storage, whether implemented as storage drives 1030 or otherwise. Hard drive implementations may be characterized as solid state, or may include rotating media storing magnetically encoded information.

Processor 1010 may be constructed from any number of transistors or other circuit elements, which may individually or collectively assume any number of states. More specifically, processor 1010 may operate as a state machine or finite-state machine. Such a machine may be transformed to a second machine, or specific machine by loading executable instructions. These computer-executable instructions may transform processor 1010 by specifying how processor 1010 transitions between states, thereby transforming the transistors or other circuit elements constituting processor 1010 from a first machine to a second machine. The states of either machine may also be transformed by receiving input from user input devices 1080, network interface 1090, other peripherals, other interfaces, or one or more users or other actors. Either machine may also transform states, or various physical characteristics of various output devices such as printers, speakers, video displays, or otherwise.

Figure 11:
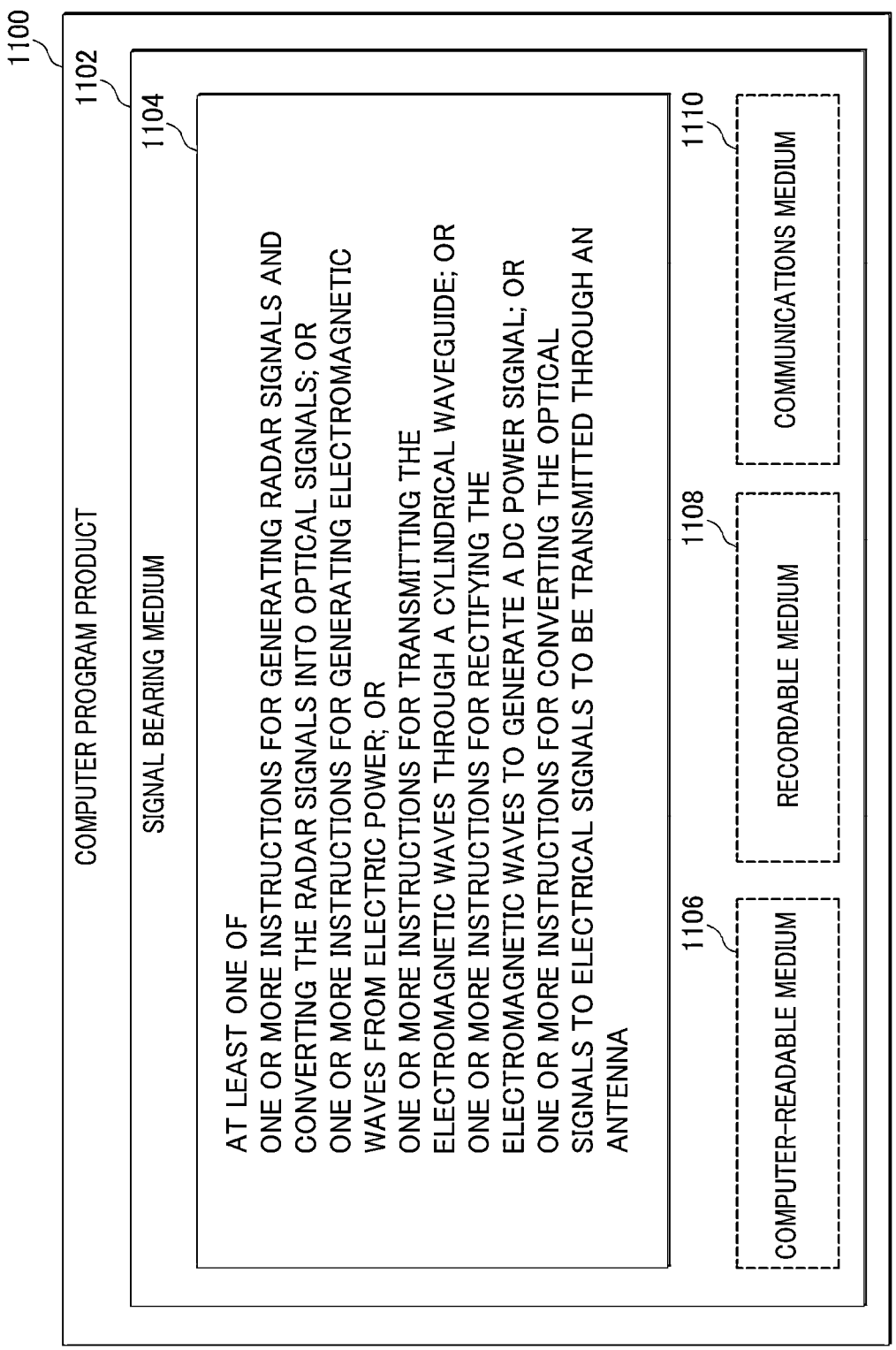
FIG. 11 illustrates computer program products that can be utilized to operate a power transmission apparatus in a borehole radar system, all arranged in accordance with at least some embodiments described herein.

FIG. 11 illustrates computer program products 1100 that can be utilized to operate a borehole radar system including a power transmission device in accordance with at least some embodiments described herein. Program product 1100 may include a signal bearing medium 1102. Signal bearing medium 1102 may include one or more instructions 1104 that, when executed by, for example, a processor, may provide the functionality described above with respect to FIGS. 1-9. By way of example, instructions 1104 may include: one or more instructions for generating radar signals and converting the radar signals into optical signals; one or more instructions for generating electromagnetic waves from electric power; one or more instructions for transmitting the electromagnetic waves through a substantially cylindrical waveguide; one or more instructions for rectifying the electromagnetic waves to generate a DC power signal; or one or more instructions for converting the optical signals to electrical signals to be transmitted through an antenna. Thus, for example, referring to FIG. 8, borehole radar system 800 may undertake one or more of the blocks shown in FIG. 9 in response to instructions 1104.

In some implementations, signal bearing medium 1102 may encompass a computer-readable medium 1106, such as, but not limited to, a hard disk drive, a Compact Disc (CD), a Digital Video Disk (DVD), a digital tape, memory, etc. In some implementations, signal bearing medium 1102 may encompass a recordable medium 1108, such as, but not limited to, memory, read/write (R/W) CDs, R/W DVDs, etc. In some implementations, signal bearing medium 1102 may encompass a communications medium 1110, such as, but not limited to, a digital and/or an analog communication medium (e.g., a fiber optic cable, a waveguide, a wired communications link, a wireless communication link, etc.). Thus, for example, program product 1100 may be conveyed to one or more modules of borehole radar system 800 by an RF signal bearing medium 1102, where signal bearing medium 1102 is conveyed by a wireless communications medium 1110 (e.g., a wireless communications medium conforming with the IEEE 802.11 standard).

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims:

What is claimed is:

1. An apparatus for transmitting electric power using an electromagnetic wave, the apparatus comprising:
    a transmitting unit configured to receive an electromagnetic wave and transmit the electromagnetic wave through a first waveguide, wherein;
    a dielectric waveguide configured to receive the electromagnetic wave from the first waveguide and direct the electromagnetic wave to a second waveguide; and
    a receiving unit configured to receive the electromagnetic wave from the dielectric waveguide through the second waveguide, wherein
    the transmitting unit comprises the first waveguide, which has a substantially cylindrical shape and one end of the first waveguide terminated by a short-circuit,
    the receiving unit comprises the second waveguide,
    the first waveguide includes a dielectric material shielded with a first substantially metallic material,
    the second waveguide includes the dielectric material shielded with a second substantially metallic material,
    the dielectric waveguide comprises the dielectric material extending between the first waveguide and the second waveguide, and
    the transmitting unit includes a monopole antenna with one end of the monopole antenna coupled to the first metallic material.

2. The apparatus of claim 1, wherein the dielectric waveguide has a substantially cylindrical shape.

3. The apparatus of claim 1, wherein the dielectric waveguide has a substantially rectangular shape.

4. The apparatus of claim 1, wherein the dielectric waveguide has a substantially elliptical shape.

5. The apparatus of claim 1, wherein the dielectric waveguide includes a plurality of directors substantially equally spaced from each other along an elongated direction of the dielectric waveguide.

6. The apparatus of claim 5, wherein each of the directors has a rod shape with a length shorter than a wavelength of the electromagnetic wave.

7. The apparatus of claim 6, wherein an elongated direction of each director is substantially aligned perpendicular to the elongated direction of the dielectric waveguide.

8. The apparatus of claim 1, wherein the receiving unit includes a monopole antenna, and wherein one end of the monopole antenna is coupled to the second metallic material.

9. The apparatus of claim 7, wherein the second waveguide has a substantially cylindrical shape, and wherein one end of the second waveguide is coupled with a conductor plate.

10. The apparatus of claim 1, wherein a frequency of the electromagnetic wave is in a range from about 50 MHz to about 3 GHz.

11. A system, comprising:
    an oscillating unit configured to generate an electromagnetic wave from a direct current (DC) power supply;
    a power transmitting unit configured to receive the electromagnetic wave generated by the oscillating unit and transmit the electromagnetic wave;
    a rectifying unit configured to receive the electromagnetic wave from the power transmitting unit and rectify the electromagnetic wave to generate a DC voltage signal;
    an optical-to-electrical converter configured to generate a radar signal,
    a transmitting antenna configured to transmit the radar signal, wherein the transmitting antenna is configured to be powered by the DC voltage signal; and
    a receiving antenna configured to receive the radar signal from the transmitting antenna, wherein the power transmitting unit includes a transmitting unit configured to receive the electromagnetic wave from the oscillating unit and transmit the electromagnetic wave through a first waveguide,
    a dielectric waveguide configured to receive the electromagnetic wave from the first waveguide and direct the electromagnetic wave to a second waveguide, and
    a receiving unit configured to receive the electromagnetic wave from the dielectric waveguide through the second waveguide, wherein the transmitting unit comprises the first waveguide and the receiving unit comprises the second waveguide, the first waveguide includes a dielectric material shielded with a first substantially metallic material, the second waveguide includes the dielectric material shielded with a second substantially metallic material, and the dielectric waveguide comprises the dielectric material extending between the first waveguide and the second waveguide.

12. The system of claim 11, wherein the dielectric waveguide has a substantially cylindrical shape.

13. The system of claim 11, wherein the dielectric waveguide includes a plurality of directors substantially equally spaced from each other along an elongated direction of the dielectric waveguide.

14. The system of claim 13, wherein each of the directors has a substantially rod shape having a length shorter than a wavelength of the electromagnetic wave.

15. The system of claim 14, wherein an elongated direction of each director is substantially aligned perpendicular to the elongated direction of the dielectric waveguide.

16. The system of claim 11, wherein the first waveguide includes a dielectric material shielded with a substantially metallic material, the transmitting unit includes a monopole antenna, and wherein one end of the monopole antenna is coupled to the metallic material.

17. The system of claim 16, wherein the first waveguide has a substantially cylindrical shape, and wherein one end of the first waveguide is short-circuited with a conductor plate.

18. The system of claim 11, wherein the second waveguide includes a dielectric material shielded with a substantially metallic material, the receiving unit includes a monopole antenna, and wherein one end of the monopole antenna is coupled to the metallic material.

19. The system of claim 18, wherein the second waveguide has a substantially cylindrical shape, and wherein one end of the second waveguide is short-circuited with a conductor plate.

20. The system of claim 11, wherein a frequency of the electromagnetic wave in a range from about 50 MHz to about 3 GHz.

21. A method for transmitting electric power using an electromagnetic wave in a borehole radar system, the method comprising:

generating, by an oscillating unit, an electromagnetic wave from a DC power supply;

transmitting, by a power transmitting unit, the electromagnetic wave through a dielectric waveguide;

rectifying, by a rectifying unit, the electromagnetic waves to generate a DC voltage signal; and converting, by an O/E (optical-to-electrical) converter which is driven to operate based on the DC voltage signal, an optical signal into an electrical signal to be transmitted through a transmitting antenna, wherein transmitting by the power transmitting unit includes:

receiving, by a transmitting unit, the electromagnetic wave from the oscillating unit and transmitting the electromagnetic wave through a first waveguide;

receiving, by a dielectric waveguide, the electromagnetic wave from the first waveguide and directing the electromagnetic wave to a second waveguide; and receiving, by a receiving unit, the electromagnetic wave from the dielectric waveguide through the second waveguide, wherein the transmitting unit comprises the first waveguide and the receiving unit comprises the second waveguide;

the first waveguide includes a dielectric material shielded with a first substantially metallic material;

the second waveguide includes the dielectric material shielded with a second substantially metallic material; and the dielectric waveguide comprises the dielectric material extending between the first waveguide and the second waveguide.

22. The method of claim 21, wherein the dielectric waveguide has a substantially cylindrical shape.

23. A computer-readable storage medium which stores a program for causing a borehole radar system to carry out radar measurements, the borehole radar system comprising a processor configured to perform an analysis of radar signals detected by the borehole radar system, the program comprising one or more instructions for:

generating, by an oscillating unit, an electromagnetic wave from a DC power supply;

transmitting, by a power transmitting unit, the electromagnetic wave through a dielectric waveguide;

rectifying, by a rectifying unit, the electromagnetic waves to generate a DC voltage signal; and converting, by an O/E (optical-to-electrical) converter which is driven to operate based on the DC voltage signal, an optical signal into an electrical signal to be transmitted through a transmitting antenna, wherein transmitting by the power transmitting unit includes:

receiving, by a transmitting unit, the electromagnetic wave from the oscillating unit and transmitting the electromagnetic wave through a first waveguide;

receiving, by a dielectric waveguide, the electromagnetic wave from the first waveguide and directing the electromagnetic wave to a second waveguide; and receiving, by a receiving unit, the electromagnetic wave from the dielectric waveguide through the second waveguide, wherein the transmitting unit comprises the first waveguide and the receiving unit comprises the second waveguide;

the first waveguide includes a dielectric material shielded with a first substantially metallic material;

the second waveguide includes the dielectric material shielded with a second substantially metallic material; and the dielectric waveguide comprises the dielectric material extending between the first waveguide and the second waveguide.

24. The computer-readable storage medium of claim 23, wherein the dielectric waveguide has a cylindrical shape.

* * * * *